(12) United States Patent
Lin (10) Patent No.: US 11,761,561 B2
(45) Date of Patent: Sep. 19, 2023

(54) EMBEDDED FIRE-RESISTANT DEVICE

(71) Applicant: Kuan-Lung Lin, New Taipei (TW)

(72) Inventor: Kuan-Lung Lin, New Taipei (TW)

(73) Assignee: Kuan-Lung, New Taipei (TW)

( * ) Notice: Subject to any disclaimer, the term of this patent is extended or adjusted under 35 U.S.C. 154(b) by 11 days.

(21) Appl. No.: 17/017,315

(22) Filed: Sep. 10, 2020

(65) Prior Publication Data

US 2021/0080034 A1    Mar. 18, 2021

(30) Foreign Application Priority Data

Sep. 12, 2019  (TW) ................................ 108132926

(51) Int. Cl.
| | | |
|---|---|---|
| *E04B 1/94* | (2006.01) | |
| *F16L 5/04* | (2006.01) | |
| *F16L 5/10* | (2006.01) | |
| *A62C 2/04* | (2006.01) | |
| *F16L 5/02* | (2006.01) | |

(52) U.S. Cl.
CPC ................ *F16L 5/04* (2013.01); *E04B 1/948* (2013.01); *F16L 5/10* (2013.01)

(58) Field of Classification Search
CPC ............ A62C 2/04; E04B 1/94; E04B 1/948; F16L 5/027; F16L 5/04; F16L 5/10
USPC ....................................................... 52/220.1
See application file for complete search history.

(56) References Cited

U.S. PATENT DOCUMENTS

| 718,302 | A | * | 1/1903 | Bartelstone | ............... | F16L 5/04 |
| | | | | | | 52/220.8 |
| 1,866,863 | A | * | 7/1932 | Richardson | ............ | B25D 17/08 |
| | | | | | | 279/19.6 |
| 1,920,524 | A | * | 8/1933 | Reed | ........................ | F16L 37/10 |
| | | | | | | 285/38 |
| 1,982,464 | A | * | 11/1934 | Buchanan | ................. | H02G 3/22 |
| | | | | | | 174/485 |
| 3,540,762 | A | * | 11/1970 | Dunlap | ................... | A62C 33/06 |
| | | | | | | 285/391 |
| 3,702,060 | A | * | 11/1972 | Cumming | .............. | F16B 13/143 |
| | | | | | | 405/259.2 |
| 3,768,846 | A | * | 10/1973 | Hensley | ................. | F16B 5/0607 |
| | | | | | | 52/750 |
| 4,269,237 | A | * | 5/1981 | Berger | ................... | F16N 31/002 |
| | | | | | | 141/330 |

(Continued)

FOREIGN PATENT DOCUMENTS

GB          2216220 A  * 10/1989  ............. A62C 2/065

OTHER PUBLICATIONS

"ep3567289a1translation.pdf" Translation and original document for EP 3567289 A1 originally published Nov. 13, 2019 but translated here, granted to KUHN GMBH ROLF [DE] (Year: 2021).*

*Primary Examiner* — Brian D Mattei
*Assistant Examiner* — Joseph J. Sadlon
(74) *Attorney, Agent, or Firm* — Kramer & Amado, P.C.

(57) ABSTRACT

An embedded fire-resistant device includes a mounting plate, a container and a fire-resistant member. The mounting plate has a contact surface and a first connection member provided on the mounting plate. The container has an open side and a second connection member provided on the open side. The fire-resistant member is received in the container. The first connection member and the second connection member are configured to slidably couple to or separate from each other so that the mounting plate and the container can engage with or separate from each other. This is a design that benefits in installation and future inspection.

10 Claims, 5 Drawing Sheets

(56) References Cited

U.S. PATENT DOCUMENTS

| | | | | |
|---|---|---|---|---|
| 4,304,079 A * | 12/1981 | Thorsten | H02G 3/22 | 52/220.2 |
| 4,493,945 A * | 1/1985 | Feldman | A62C 3/16 | 428/920 |
| 5,099,625 A * | 3/1992 | Staudt | E06B 5/16 | 52/220.8 |
| 5,184,851 A * | 2/1993 | Sparling | F16L 37/252 | 285/314 |
| 5,195,286 A * | 3/1993 | DeLong | H02G 3/288 | 174/505 |
| 5,237,791 A * | 8/1993 | Scanlan | F16B 5/07 | 403/252 |
| 5,394,867 A * | 3/1995 | Swann | A62B 17/04 | 128/201.28 |
| 5,501,048 A * | 3/1996 | Nakanishi | E04B 1/0007 | 52/295 |
| 5,908,180 A * | 6/1999 | Daoud | H02G 3/0658 | 248/56 |
| 6,109,485 A * | 8/2000 | Amidzich | B67D 1/0832 | 137/212 |
| 6,340,181 B1 * | 1/2002 | Amatsutsu | F16L 37/088 | 52/220.8 |
| 6,386,550 B1 * | 5/2002 | Mokrzycki | E02D 29/12 | 52/21 |
| 6,433,700 B1 * | 8/2002 | Malewski | G08B 17/113 | 340/628 |
| 6,553,730 B1 * | 4/2003 | Mueller | E04B 2/7433 | 439/654 |
| 7,024,824 B1 * | 4/2006 | Widlacki | B21D 39/06 | 52/220.8 |
| 7,108,101 B1 * | 9/2006 | Westhoff | B28B 21/56 | 182/90 |
| 7,543,855 B2 * | 6/2009 | Ambrosi | F16L 37/113 | 285/85 |
| 7,549,258 B2 * | 6/2009 | Lajewski | F24F 13/084 | 439/544 |
| 7,762,042 B2 * | 7/2010 | Packard, III | H02G 3/0608 | 52/848 |
| 8,029,345 B2 * | 10/2011 | Messmer | F16L 5/04 | 454/284 |
| 8,336,920 B2 * | 12/2012 | Stempo | F16L 27/0808 | 285/114 |
| 8,393,121 B2 * | 3/2013 | Beele | F16L 5/04 | 52/220.8 |
| 8,807,601 B2 * | 8/2014 | Anderson | F16B 43/004 | 285/344 |
| 8,833,478 B2 * | 9/2014 | Zernach | F16L 27/0808 | 285/114 |
| 8,881,478 B2 * | 11/2014 | Gray | E04B 1/26 | 52/223.14 |
| 9,086,174 B2 * | 7/2015 | McConnell | E04B 5/48 | |
| 9,103,116 B2 * | 8/2015 | McConnell | G08B 17/113 | 340/628 |
| 9,140,011 B2 * | 9/2015 | Sileno | E04C 2/521 | |
| 9,228,346 B2 * | 1/2016 | de Freitas Silvestre | E04G 9/08 | |
| 10,165,877 B2 * | 1/2019 | Sorensen | B65D 25/04 | |
| 10,975,567 B2 * | 4/2021 | Brown | A62C 2/065 | |
| 11,079,050 B2 * | 8/2021 | Deneke | F16L 37/113 | |
| 2014/0076482 A1 * | 3/2014 | Kunk | B32B 17/04 | 156/185 |
| 2014/0097315 A1 * | 4/2014 | Korcz | H02G 3/20 | 248/324 |
| 2015/0121782 A1 * | 5/2015 | McConnell | F16L 5/04 | 52/232 |
| 2019/0136642 A1 * | 5/2019 | Persent | E21B 17/085 | |

* cited by examiner

EMBEDDED FIRE-RESISTANT DEVICE

BACKGROUND OF THE INVENTION

Field of the Invention

The present disclosure relates to fire-resistant devices and, more particularly, to an embedded fire-resistant device for use in the building. In particular, the embedded fire-resistant device includes a means for unfastening and fastening for replacing a fire-resistant member in the building.

Description of the Prior Art

Owing to advancement in construction technology, criteria for judging construction quality are increasingly strict, especially in terms of energy saving capability and safety of buildings. Pipes are embedded in buildings, such as water pipes, electrical cables, and gas pipes. In this regard, electrical cables and gas pipes have the strictest safety requirements, because electricity and gas catch fire more easily than water. Once a pipe ignites, fire and resultant smoke can be readily transported to every corner in the building via the pipe rather than confined to a specific space.

To curb the spread of fire along pipes, the pipes are often accompanied by fire-resistant devices when embedded. For instance, conventional fire-resistant devices are embedded in parts of a building, for example, floors and walls. Depending on the construction techniques and types of the floors and walls, fire-resistant devices vary in the way they are installed in order to conform to various construction techniques. For instance, common types of walls include concrete walls, cement grouting walls, and lightweight partition walls. If one pipe extends along two or more types of walls of a building, it will respectively require suitable fire-resistant devices, which may be inconvenient for the construction workers.

Furthermore, most fire-resistant devices are embedded in walls and floors, and thus it is difficult to replace fire-resistant members having an approaching expiration date or already affected by moisture. As a result, willingness to replace fire-resistant members is too little to bring the performance of fire-resistant devices into full play, thereby undermining building safety.

Therefore, it is imperative to provide a fire-resistant device which not only facilitates replacing an internal fire-resistant member without destructing the building structure but is also suitable for use with all types of walls and floors.

SUMMARY OF THE INVENTION

It is an objective of the present disclosure to provide an embedded fire-resistant device, comprising: a mounting plate having a contact surface configured for contacting a building and a first connection member provided on the contact surface; a container having an open side and a second connection member provided on the open side; and a fire-resistant member received in the container. The first connection member and the second connection member are configured to be detachably connected, such that the mounting plate and the container are optionally coupled together or separated.

In a specific embodiment, the first connection member has a plurality of recesses, and the second connection member has a plurality of bumps configured to be received in the plurality of recesses, wherein the plurality of recesses defines a sliding path for the corresponding bumps, and the sliding path has two different sliding directions.

In a specific embodiment, the connection is an engaging connection or fastening connection.

Another objective of the present disclosure is to provide an embedded fire-resistant device, comprising: a mounting plate having a contact surface configured for contacting a building and a first connection member provided on the contact surface; a container having an open side and a second connection member provided on the open side; and a fire-resistant member received in the container. The first connection member has a connection surface and a plurality of recesses defined on the first connection member. The recesses each have a first restrictive area and a second restrictive area. The second connection member has a plurality of bumps configured to be optionally received in the plurality of recesses, such that the mounting plate and the container are optionally coupled together or separated. The bumps each is movable in a first direction to pass through the first restrictive area of the corresponding recesses. The bumps each is movable in a second direction to pass through the second restrictive area of the corresponding recesses. The first direction is different from the second direction.

In a specific embodiment, the first restrictive area prohibits movement of the corresponding bumps in the second direction, whereas the second restrictive area prohibits movement of the corresponding bumps in the first direction. The size of the first restrictive area is greater than the size of the second restrictive area.

Yet another objective of the present disclosure is to provide a method of using the embedded fire-resistant device, wherein the embedded fire-resistant device is embedded in a wall or floor of a building. The method comprises the steps of: separating the embedded fire-resistant device from a hole of the building; separating the container from the mounting plate to expose a fire-resistant member disposed in the container; replacing the fire-resistant member; connecting the mounting plate and the container; and placing the container in the hole of the building.

In a specific embodiment, the container is separated from the mounting plate by a reverse rotation operation.

Still yet another objective of the present disclosure is to provide a mounting plate used in an embedded fire-resistant device, comprising: a contact surface configured for contacting a building; and a first connection member provided on the contact surface, wherein the first connection member is configured to detachably connect to a second connection member of a container placed in the building via a means for detachable connection, wherein the container receives a fire-resistant member.

In a specific embodiment, the means for detachable connection includes the first connection member with a plurality of recesses defined thereon.

In a specific embodiment, the plurality of recesses defines a sliding path for the connection, and the sliding path has two different directions.

The above and other features and advantages of the present disclosure are hereunder illustrated with specific embodiments, depicted with drawings, and described below.

BRIEF DESCRIPTION OF THE DRAWINGS

The accompanying drawings and the description below are conducive to further comprehension of the present disclosure. The embodiments presented below are non-restrictive, inexhaustive and are formulated in accordance with the accompanying drawings. The accompanying drawings are not drawn to scale but are mainly intended to explain related structures and principles.

DETAILED DESCRIPTION OF THE EMBODIMENTS

The present disclosure is depicted with accompanying drawings, illustrated by specific embodiments, and described in detail below. However, subject matters of the present disclosure can be implemented in various ways; thus, construction of the encompassed or claimed subject matters are not restricted to the embodiments of the present disclosure. The embodiments of the present disclosure are merely illustrative of the present disclosure. The scope of the present disclosure is reasonably broad for the encompassed or claimed subject matters. For instance, the claimed subject matters are a method, device and/or system. Therefore, the specific embodiments are implemented with hardware, software, firmware or any combination (not software conventionally) thereof.

The expression "in an/one embodiment" used herein does not necessarily refer to any identical embodiments. The expression "in (some) other embodiments" used herein does not necessarily refer to any different embodiments. Therefore, for instance, the claimed subject matters encompass a combination of embodiments in whole or in part. The word "embedded" used herein applies to the situation where at least part of a fire-resistant device is enclosed in, inserted into, extended into or hidden in a building, but not exclusive of the situation where the fire-resistant device is detachable from the building. Preferably, the "embedded" indicates the situation where the fire-resistant device is flush with a surface of the building.

Figure 1:
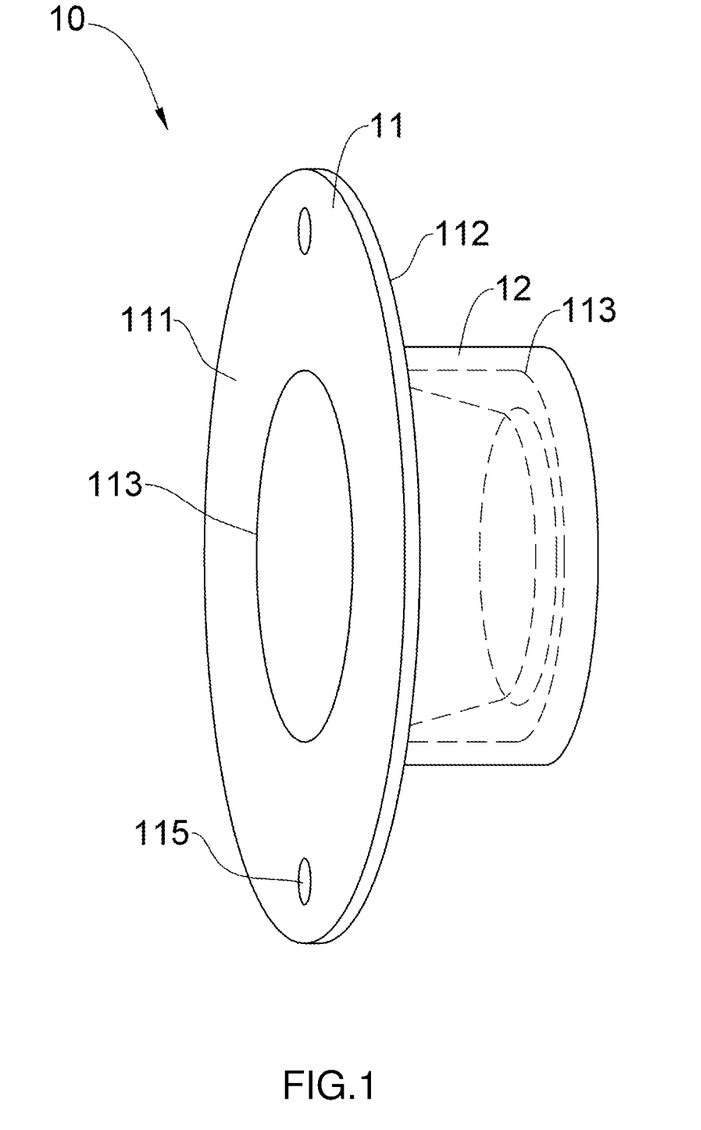
FIG. 1 is a perspective view of an embedded fire-resistant device of the present disclosure.
Figure 2:
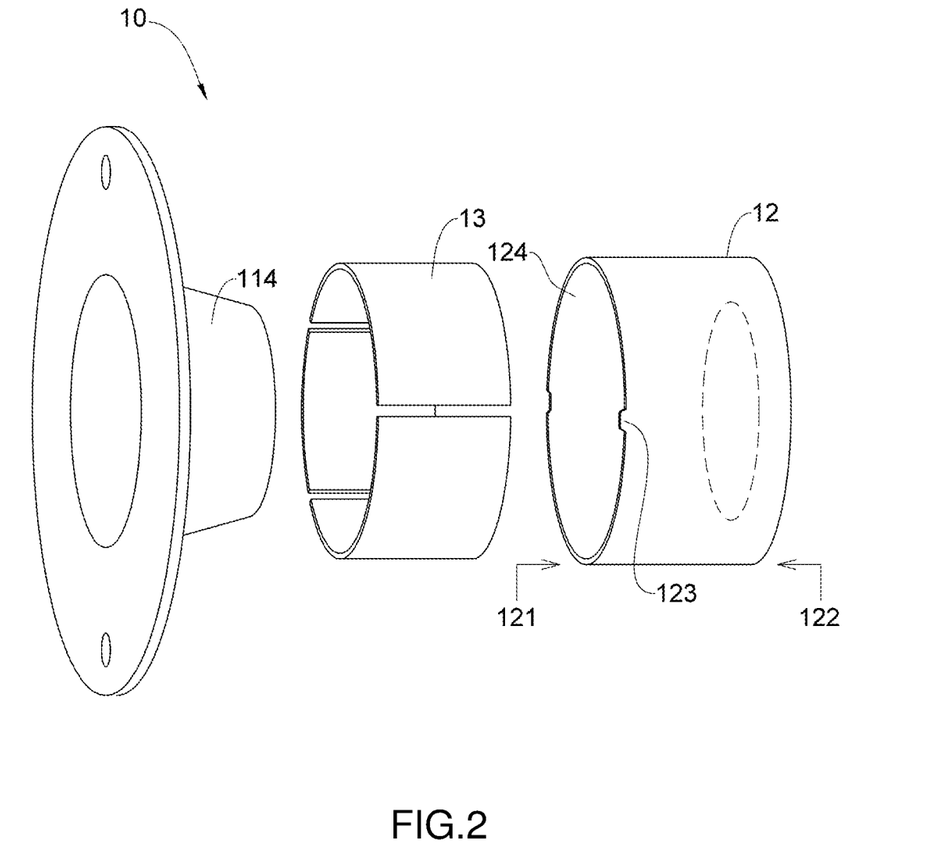
FIG. 2 is an exploded view of the embedded fire-resistant device shown in FIG. 1.

FIG. 1 and FIG. 2 are respectively a perspective view and an exploded view of an embedded fire-resistant device (10) of the present disclosure. The fire-resistant device (10) comprises a mounting plate (11), a container (12) and a fire-resistant member (13).

The mounting plate (11) is a disk which has a front surface (111) and a contact surface (112) opposing the front surface (111). The contact surface (112) is an area where the embedded fire-resistant device (10) comes into contact with a wall surface. Therefore, when installation, the contact surface (112) faces a wall. A first connection member (shown in FIG. 3A) is disposed on the contact surface (112). The mounting plate (11) has an opening (113) whose size is appropriately chosen to conform to the diameters of pipes, such as water pipes, electrical cables, and gas pipes. In an embodiment, a resilient sleeve (114) is disposed on the mounting plate (11) and extends from the opening (113) to the contact surface (112), as shown in FIG. 2. Alternatively, the resilient sleeve (114) may be substituted by a structure such as lips or silica elements. Therefore, the pipes are resiliently confined to the opening (113). The mounting plate (11) may be provided with a hole or without a hole. For the sake of convenience for construction, the mounting plate (11) preferably has a plurality of holes (115) which can be used with a conventional means for fixing (such as screws) to fix the mounting plate (11) to a wall surface.

Figure 3A:
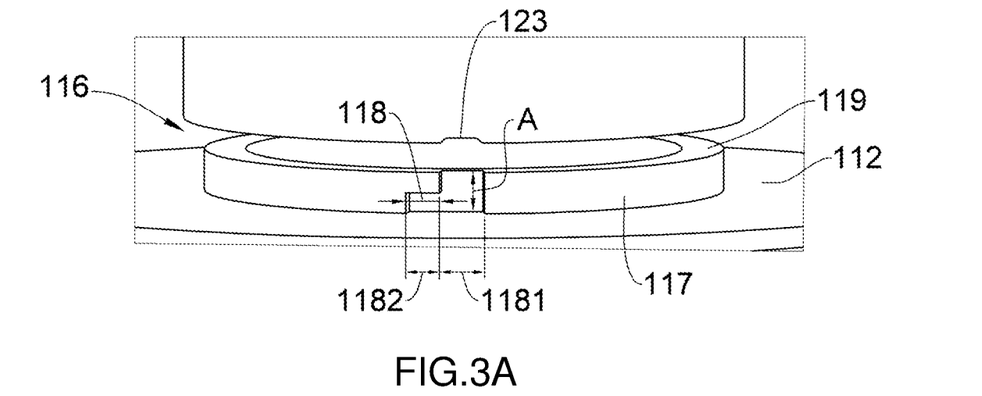
FIG. 3A through FIG. 3C are schematic views showing means for mounting the embedded fire-resistant device of the present disclosure in place.

FIG. 3A shows the first connection member of the mounting plate (11), which is configured for the connection of the container (12). In this embodiment, the first connection member is a ring-shaped connection member (116), disposed on the contact surface (112) of the mounting plate (11), and matches the opening (113) shown in FIG. 1 in size. The ring-shaped connection member (116) has a connection surface (117) which is the main contact surface for use in connection. When connecting, the connection surface (117) is parallel to and corresponding to an inner surface of the container (12). In another embodiment, said connection surface may be different from the connection surface (117) shown in the drawing and may be, for example, a flat surface of the ring-shaped connection member (116) or a corresponding inner annular surface of the ring-shaped connection member (116). One or more recesses (118) are defined on the connection surface (117), such that the ring-shaped connection member (116) and the container (12) are detachably connected. Said detachable connection refers to a selective connection mode in which two members can be connected or separated, for example, engaged together with a specific structure or connected by a well-known means for fastening. This embodiment is exemplified by a slidable engagement. The recesses (118) dent inward from the connection surface (117) and have a first restrictive area (1181) and a second restrictive area (1182). The first restrictive area (1181) and the second restrictive area (1182) are of different sizes. As shown in the drawings, the first restrictive area (1181) extends vertically from the contact surface (112) to a top surface (119) of the ring-shaped connection member (116), whereas the second restrictive area (1182) extends vertically from the contact surface (112) without reaching the top surface (119). The purpose of the recesses (118) is described later.

The container (12) is cylindrical and has two open sides (121, 122), as shown in FIG. 2. The size of the container (12) is chosen to allow the container (12) to appropriately match the first connection member of the mounting plate (11) and the pipes in size. One open side (121) is defined proximate to the contact surface (112), whereas the other open side (122) is defined proximate to the terminal end of the embedded fire-resistant device (10). The open side (121) at the front of the container (12) is configured to be slidably coupled to and separated from the contact surface (112) of the mounting plate (11). Referring to FIG. 2, a second connection member is provided on the open side (121) of the container (12) to operate in conjunction with the first connection member of the mounting plate (11), that is, the ring-shaped connection member (116). In this embodiment, the second connection member has a plurality of bumps (123). The bumps (123) extend from an inner lateral surface (124) of the container (12) to a common center (not shown). If the container (12) is made of metal, the bumps (123) can be formed by bending the edges of the container (12) slightly. If the container (12) is made of plastic, the bumps (123) can be integrally formed with a cylindrical structure.

The bumps (123) of FIG. 2 collaborate with the recess (118) of FIG. 3A, such that the mounting plate (11) and the container (12) can be coupled together and separated. The size of the first restrictive area (1181) matches the size of the bumps (123). The first restrictive area (1181) ensures that the bumps (123) can move only in a first direction (A). The size of the second restrictive area (1182) matches the size of the bumps (123). The second restrictive area (1182) ensures that the bumps (123) can move only in a second direction (B). Alternatively, the first restrictive area (1181) ensures that the bumps (123) cannot move in the second direction (B). The second restrictive area (1182) ensures that the bumps (123) cannot move in the first direction (A). As shown in the drawing, the first direction (A) and second direction (B) are substantially perpendicular to each other. However, in another possible embodiment, depending on the design of the recesses, the first direction and second direction may not be perpendicular to each other.

Figure 3B:
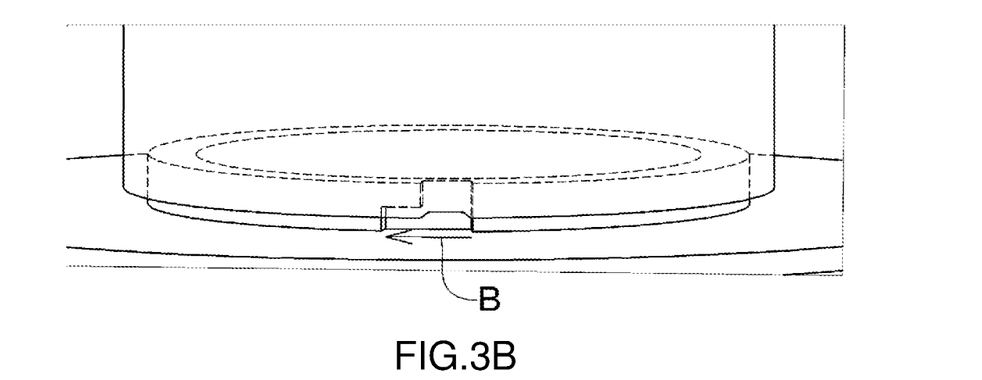
Figure 3C:
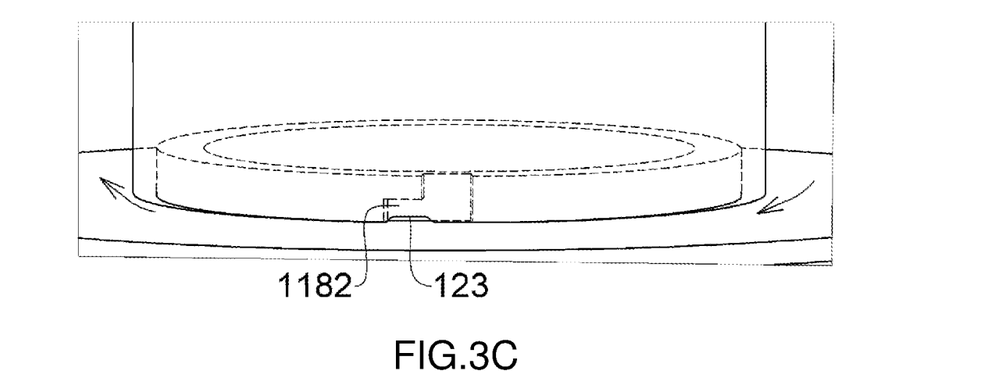

FIG. 3A and FIG. 3B show the process where the first connection member of the mounting plate (11) and the second connection member of the container (12) collaborate with and connect to each other. The open side (121) of the container (12) approaches the contact surface (112) of the mounting plate (11), with the bumps (123) corresponding in position to the recesses (118), until the bumps (123) slide into and pass through the first restrictive area (1181) of the corresponding recesses (118) to finally stop at the contact surface (112). The foregoing is the first step of coupling together the mounting plate (11) and the container (12). Within the first restrictive area (1181), the bumps (123) can only slide in the first direction (A), such that the mounting plate (11) and the container (12) can approach each other or move away from each other. When the bumps (123) are at the endpoint of the first restrictive area (118), the container (12) can be rotated such that the bumps (123) slide in the second direction (B) and pass through the second restrictive area (1182), which is the second step of coupling together the mounting plate (11) and the container (12), as shown in FIG. 3B. Within the second restrictive area (1182), the bumps (123) can only slide in the second direction (B) until the bumps (123) completely stay in the second restrictive area (1182), such that the bumps (123) and recesses (118) engage with each other. The second restrictive area (1182) stops the bumps (123) from sliding in the first direction (A), so as to prevent separation of the mounting plate (11) and the container (12). Likewise, the mounting plate (11) and the container (12) can be separated by reverse operation.

The recesses (118) and the bumps (123) can have fine structures so as to engage with each other better and avoid inadvertent disconnection. In another embodiment, the recesses (118) and the bumps (123) may be swapped in position, with the recesses (118) formed at the second connection member of the container (12), and the bumps (123) at the first connection member of the mounting plate (11). In another embodiment, the container is of a smaller size than the ring-shaped connection member, i.e. the outer surface of the container (12) faces an inner lateral surface of the ring-shaped connection member (116), such that the recesses (118) can be formed on an inner lateral surface of the ring-shaped connection member (116), allowing the bumps (123) to be provided on the outer lateral surface of the container (12). Although the aforesaid variations are not depicted by the accompanying drawings, persons skilled in the art are able to implement the aforesaid variations by referring to the above description.

Referring back to FIG. 2, the size and shape of the fire-resistant member (13) are chosen to allow the fire-resistant member (13) to be received in the container (12) without affecting configuration of the pipes. For instance, the fire-resistant member (13) is shaped to be sheet-shaped or ring-shaped. The fire-resistant member (13) may be conventional fire-resistant materials, such as a heat-triggered expandable foam material capable of blocking smoke by filling the pipes to stop the spread of fire and smoke. When the mounting plate (11) and the container (12) are coupled together, the fire-resistant member (13) is received therebetween. The resilient sleeve (114) of FIG. 2 or the ring-shaped connection member (116) of FIG. 3A may have appropriate vertical extension to prevent the received fire-resistant member (13) from falling into the pipes or being exposed from the opening (113). Similarly, any other restrictive members can be disposed in the container (12) to facilitate fixing the fire-resistant member (13) in place. Upon separation of the mounting plate (11) and the container (12), the fire-resistant member (13) can be taken out from the open side (121) of the container (12) and then replaced with any other fire-resistant member. After the two aforesaid steps, the process of replacing the embedded fire-resistant device (10) is finished.

Figure 4A:
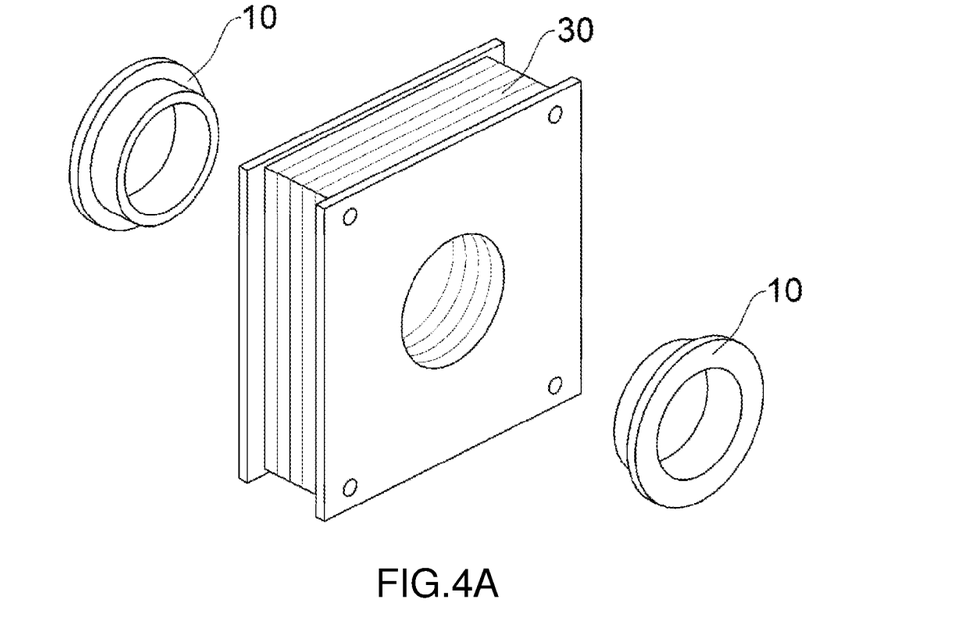
FIG. 4A and FIG. 4B are schematic views of applying the embedded fire-resistant devices of the present disclosure to a wall.
Figure 4B:
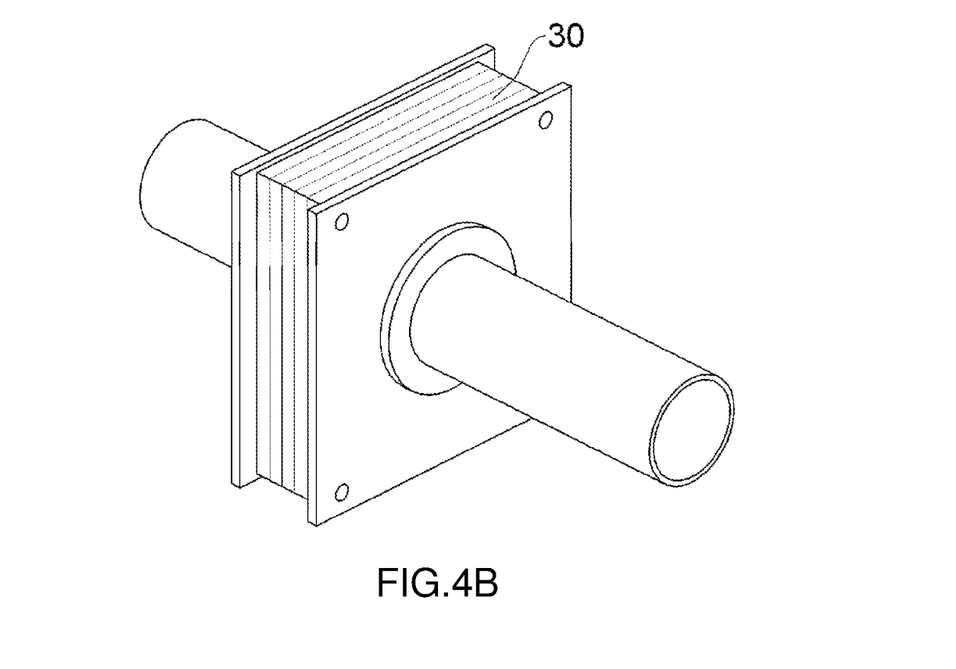

FIG. 4A and FIG. 4B are schematic views of mounting the embedded fire-resistant devices of the present disclosure (10) on a wall (30). The wall is not necessarily built by a single construction method. Regardless of whether the wall is a concrete wall, cement grouting wall, or lightweight partition wall, the wall will be applicable to the embedded fire-resistant devices (10) of the present disclosure, provided that a through hole is formed during or upon completion of the construction process. Before inserting a pipe into the through hole, the embedded fire-resistant devices (10) of appropriate size are fixed to the two ends of the through hole, as shown in FIG. 4A. As mentioned above, the contact surface (112) of the mounting plate (11) comes into contact with the wall surface, and then the mounting plate (11) is fixed to the wall surface with screws, allowing the container (12) to be received in the through hole. After that, the pipe is inserted from the opening (113) of one of the embedded fire-resistant devices (10) into the through hole and then passes through the opening (113) of the other opposing embedded fire-resistant device (10), as shown in FIG. 4B. The embedded fire-resistant devices (10) space apart the pipe and the wall (30); thus, there is a gap between the wall and the pipe portion inserted therein, and the gap can accommodate any other fire-resistant members. The embedded fire-resistant devices (10) provided on the two sides of the wall (30) serve a fire-resistance purpose and thus prevent fire and smoke from spreading. To check or change the fire-resistant devices (10), it is feasible to remove the fire-resistant devices (10) from the wall surface without removing the pipe. The removed embedded fire-resistant devices (10) can be further dismantled by separating the mounting plate (11) and the container (12), so as to expose the otherwise received fire-resistant member (13). In a possible embodiment, the size of the mounting plate (11) may approximate to or be slightly less than the diameter of the through hole, such that the embedded fire-resistant devices (10) can be positioned deeper in the through hole.

Figure 5:
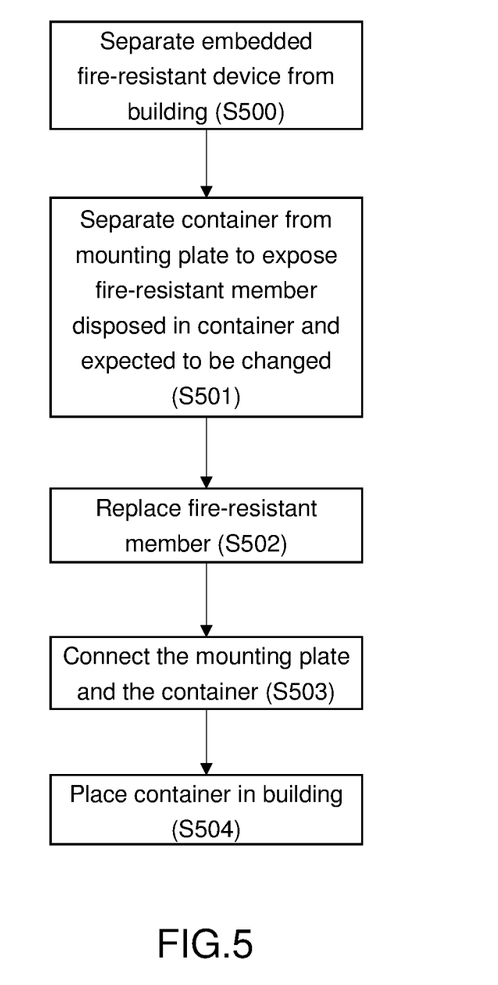
FIG. 5 is a process flow chart illustrating the method for replacing the fire-resistant members in the embedded fire-resistant devices according to the present disclosure.

FIG. 5 is a process flow of a method for replacing the fire-resistant members (13) in the embedded fire-resistant devices (10) according to the present disclosure. The method includes steps S500~S504. The situation discussed here is the floor or wall in the building and other similar buildings, and is provided with the embedded fire-resistant devices of the present disclosure, as shown in FIG. 4B. At step S500, separate the embedded fire-resistant devices (10) from the building, for example, separate the mounting plates (11) of the embedded fire-resistant devices (10) from the building with or without a tool, such as a fastening tool, such that the embedded fire-resistant devices (10) can be removed from the building. In step S501, the container (12) is separated from the mounting plate (11) to expose the fire-resistant members (13) to be changed, which are disposed in the container (12). In a specific embodiment, as with the aforesaid slidable engagement, the worker can separate the mounting plate (11) and the container (12) with both hands by reverse rotation operation. In step S502, the fire-resistant members are changed. In step S503, the mounting plate (11) and the container (12) are connected again. In step S504, the container (12) is inserted into a hole of the building, so as to finalize the process of replacing the fire-resistant members. In another embodiment, step S503 and step S504 may be swapped in sequence. The replacing process is carried out, regardless of whether the building is equipped with any pipes.

In conclusion, the embedded fire-resistant device of the present disclosure is applicable to different types of walls and even floors. Since the embedded fire-resistant device of the present disclosure is mounted on a wall, not only can the embedded fire-resistant device be demounted without destructing the wall or any pipes associated with the wall, but the fire-resistant member in the embedded fire-resistant device can also be inspected easily. Therefore, the embedded fire-resistant device of the present disclosure provides more flexible choices to constructors.

Although the present disclosure is described in detail above. Persons skilled in the art understand that specific changes and modification may be made to the present disclosure without extending beyond the scope of the appended claims. Therefore, the aforesaid embodiments are illustrative rather than restrictive of the present disclosure. Furthermore, the present disclosure is not restricted to the disclosure herein but may be amended, and all amendments must be deemed falling within the scope, and equivalent scope, of the appended claims.

What is claimed is:

1. An embedded fire-resistant device, comprising:
a mounting plate having an opening for pipe penetration, a contact surface configured for contacting a building and a first connection member protruding from the contact surface, wherein the first connection member defines the opening of the mounting plate;
a container having an open side and a second connection member provided on the open side; and
a fire-resistant member received in the container,
wherein the first connection member and the second connection member are configured to be detachably connected, such that the mounting plate and the container are optionally coupled together or separated, and the first connection member is sheathed by the container when the mounting plate and the container connect with each other.

2. The device of claim 1, wherein the first connection member has a plurality of recesses, and the second connection member has a plurality of bumps configured to be received in the plurality of recesses, wherein the plurality of recesses defines a sliding path for the corresponding bumps, and the sliding path has two different sliding directions.

3. The device of claim 1, wherein the first connection member and the second connection member are configured to be detachably connected by one of an engaging connection or a fastening connection.

4. A method of using the embedded fire-resistant device of claim 1, wherein the embedded fire-resistant device is embedded in a hole of a building, the method comprising the steps of:
separating the embedded fire-resistant device from the hole of the building;
separating the container from the mounting plate to expose the fire-resistant member disposed in the container;
replacing the fire-resistant member;
connecting the mounting plate and the container; and
placing the container in the hole of the building.

5. An embedded fire-resistant device, comprising:
a mounting plate having an opening for pipe penetration, a contact surface configured for contacting a building and a first connection member protruding from the contact surface, wherein the first connection member defines the opening of the mounting plate;
a container having an open side and a second connection member provided on the open side; and
a fire-resistant member received in the container,
wherein the first connection member has a connection surface and a plurality of recesses dented inward from the connection surface, and the second connection member has a plurality of bumps configured to be optionally received in the plurality of recesses, such that the mounting plate and the container are optionally coupled together or separated, and the first connection member is sheathed by the container when the mounting plate and the container connect with each other.

6. The device of claim 5, wherein the recesses of the first connection member-allow the bumps to slide therein along a direction.

7. An embedded fire-resistant device, comprising:
a mounting plate having an opening for pipe penetration, a contact surface configured for contacting a building and a first connection member protruding from the contact surface, wherein the first connection member defines the opening of the mounting plate;
a container having an open side and a second connection member disposed on the open side; and
a fire-resistant member received in the container, wherein the first connection member has a connection surface with a plurality of recesses dented inward from the connection surface, and the plurality of recesses each has a first restrictive area and a second restrictive area,
wherein the second connection member has a plurality of bumps, the bumps each are movable in a first direction to pass through the first restrictive area of a corresponding recesses, the bumps each are movable in a second direction to pass through the second restrictive area of the corresponding recesses, and the first direction is different from the second direction, such that the recesses optionally receive the bumps, in order to couple together or separate the mounting plate and the container, and the first connection member is sheathed by the container when the mounting plate and the container connect with each other.

8. The device of claim 7, wherein the first restrictive area prohibits movement of the corresponding bumps in the second direction, and the second restrictive area prohibits movement of the corresponding bumps in the first direction, wherein a size of the first restrictive area is greater than a size of the second restrictive area.

9. A mounting plate used in an embedded fire-resistant device, comprising:
a contact surface configured for contacting a building; and
a first connection member protruding from the contact surface and defining an opening of the mounting plate, wherein the first connection member is configured to detachably connect to a second connection member of a container placed in the building via a means for detachable connection, wherein the container receives a fire-resistant member, and the first connection member is sheathed by the container when the mounting plate and the container connect with each other.

10. The mounting plate of claim 9, wherein the means for detachable connection includes the first connection member having a plurality of recesses defined thereon, wherein the plurality of recesses define a sliding path for connection, and the sliding path has two different sliding directions.

\* \* \* \* \*